United States Patent
Buehs et al.

(10) Patent No.: US 10,836,430 B2
(45) Date of Patent: *Nov. 17, 2020

(54) MOTOR VEHICLE, SYSTEM AND METHOD FOR OPERATING SUCH A MOTOR VEHICLE AND SUCH A SYSTEM

(71) Applicant: SIEMENS MOBILITY GMBH, Munich (DE)

(72) Inventors: Florian Buehs, Berlin (DE); Oliver Graebner, Neubiberg (DE)

(73) Assignee: Siemens Mobility GmbH, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/639,170

(22) Filed: Jun. 30, 2017

(65) Prior Publication Data
US 2018/0001929 A1 Jan. 4, 2018

(30) Foreign Application Priority Data
Jun. 30, 2016 (DE) .......................... 10 2016 211 855

(51) Int. Cl.
*B62D 15/02* (2006.01)
*G01C 21/30* (2006.01)
(Continued)

(52) U.S. Cl.
CPC .............. *B62D 15/025* (2013.01); *B60L 5/10* (2013.01); *B60L 5/36* (2013.01); *B62D 6/008* (2013.01);
(Continued)

(58) Field of Classification Search
CPC ...... B62D 15/025; B62D 6/008; G01C 21/30; B60L 5/10; B60L 5/36; B60L 2240/66;
(Continued)

(56) References Cited

U.S. PATENT DOCUMENTS

| 8,838,320 B2 | 9/2014 | Stratton et al. |
| 2012/0013743 A1* | 1/2012 | Tanarro Marquez ..... B60L 5/26 348/148 |

(Continued)

FOREIGN PATENT DOCUMENTS

| DE | 102012205276 A1 | 10/2013 |
| DE | 112013001814 T5 | 2/2015 |

OTHER PUBLICATIONS

Machine Translation of EP 2644432 (Year: 2013).*
(Continued)

*Primary Examiner* — Alan D Hutchinson
(74) *Attorney, Agent, or Firm* — Laurence Greenberg; Werner Stemer; Ralph Locher (57) ABSTRACT

A motor vehicle has a control device, a first sensor and a global positioning device. The control device has a control unit and a data memory. At least one item of information about an arrangement of an overhead line is stored on the data memory. The control unit is connected to the first sensor and to the global positioning device. The first sensor determines a position of the overhead line relative to the motor vehicle and provides the control unit with the relative position. The global positioning device determines a global position of the motor vehicle and provides the control unit with it. The control unit, on the basis of the established relative position, the established global position and the information about the arrangement of the overhead line, calculates a position of the motor vehicle.

18 Claims, 7 Drawing Sheets

(51) Int. Cl.
  *B60L 5/36* (2006.01)
  *B60L 5/10* (2006.01)
  *B62D 6/00* (2006.01)
  *G05D 1/02* (2020.01)
  *B60L 5/26* (2006.01)
  *B60M 1/12* (2006.01)

(52) U.S. Cl.
  CPC ............ *G01C 21/30* (2013.01); *G05D 1/024* (2013.01); *G05D 1/0278* (2013.01); *B60L 5/26* (2013.01); *B60L 2200/26* (2013.01); *B60L 2240/66* (2013.01); *B60M 1/12* (2013.01); *G05D 2201/0213* (2013.01)

(58) Field of Classification Search
  CPC ..... B60L 2200/26; B60L 5/26; G05D 1/0278; G05D 1/024; G05D 2201/0213; B60M 1/12
  See application file for complete search history.

(56) References Cited

U.S. PATENT DOCUMENTS

2012/0123613 A1* 5/2012 Waki ................... G08G 1/167
  701/1
2013/0261868 A1* 10/2013 Stratton ............... B62D 15/025
  701/23
2014/0097054 A1 4/2014 Francke et al.

OTHER PUBLICATIONS

Sachse T. et al.: "Intelligent traffic control and optimization with cooperative systems on the eHighway"; 2014 International Conference on Connected Vehicles and Expo (ICCVE), Nov. 3-7, 2014, Vienna, Austria, pp. 558-564—ISBN 978-1-4 799-6730-8; 2014.

* cited by examiner

MOTOR VEHICLE, SYSTEM AND METHOD FOR OPERATING SUCH A MOTOR VEHICLE AND SUCH A SYSTEM

CROSS-REFERENCE TO RELATED APPLICATION

This application claims the priority, under 35 U.S.C. § 119, of German application DE 10 2016 211 855.2, filed Jun. 30, 2016; the prior application is herewith incorporated by reference in its entirety.

BACKGROUND OF THE INVENTION

Field of the Invention

The invention relates to a motor vehicle, to a system and to a method for operating such a motor vehicle.

A motor vehicle with a camera, a global positioning device and a control device is known. The camera records a video image of a section of a roadway located in front of the vehicle, the global positioning device determines a global position on the basis of satellite information and the control device recognizes roadway markings on the basis of pattern recognition of the video image recorded by the camera and thus verifies a global position of the global positioning device for a position of the motor vehicle. Because of bad weather conditions the roadway marking can be poorly detected by pattern recognition methods. In particular when it is snowing and the roadway is covered by snow the roadway marking cannot be acquired.

A non rail-based vehicle is known from published, German patent application DE 10 2012 205 276 A1, which has a current collector for feeding-in electrical energy from a two-pole overhead line arranged along a lane with contact wires embodied as outgoing and return conductors. In this case the current collector has at least one contact strip per contact wire with a working area for contacting the contact wires. The vehicle further has a detection device for detecting the relative location of the current collector in relation to the contact wires. In addition the vehicle has a steering assistance system for steering the vehicle automatically as a function of the relative location acquired.

A system and a method for driving an all-terrain truck along a route in relation to an overhead wire is known from German utility model DE 11 2013 001 814 T5, wherein a position of the all-terrain truck on the route is established by detection of two or more objects at the edge of the route.

SUMMARY OF THE INVENTION

The object of the invention is to provide an improved motor vehicle, an improved system and an improved method for operation of such a motor vehicle and of such a system.

In accordance with the invention it has been recognized that an improved motor vehicle can be provided by the motor vehicle having a control device, a first sensor and a global positioning device. The control device has a control unit and a data memory, wherein at least one item of information about an arrangement of an overhead line is stored in the data memory. The control unit is connected to the first sensor and to the global positioning device. The first sensor determines a relative position of the overhead line in relation to the motor vehicle and provides the control unit with the relative position. The global positioning device determines a global position of the motor vehicle and provides the control unit with it. The control unit establishes a position of the motor vehicle on the basis of the established relative position, the established global position and the information about the arrangement of the overhead line.

This embodiment has the advantage that, independent of the weather, especially when the roadway is covered by snow, the position of the motor vehicle can be determined reliably and precisely.

In a further form of embodiment the motor vehicle has a second sensor connected to the control unit. The second sensor establishes a trajectory of the motor vehicle and provides the control unit with the established trajectory. On the basis of the position of the motor vehicle and the arrangement of the overhead line, the control unit establishes a driving channel. The control unit compares the driving channel with the trajectory in a comparison. Depending on the result of the comparison, the control unit provides a control signal. In this way the motor vehicle can be controlled reliably by the control signal.

In a further form of embodiment the motor vehicle has a display device, wherein the display device is connected to the control unit. The control unit controls the display device by the control signal such that the display device displays a direction of travel for a driver of the motor vehicle. In this way the motor vehicle driver can drive the motor vehicle reliably underneath the overhead line, without the motor vehicle driver having both to concentrate on the roadway and also look at the overhead line.

In a further form of embodiment the motor vehicle has a current collector with at least one contact strip, at least one actuator and a supporting structure. The actuator is coupled to the supporting structure. The supporting structure bears the contact strip and is embodied to bring the contact strip into touching contact with the overhead line. The actuator is connected to the control unit, wherein the actuator is coupled mechanically to the supporting structure and is embodied to change a contact strip position. The control unit is embodied, based on the trajectory and position of the motor vehicle, to establish a contact strip range. The control unit is embodied, based on the contact strip range and the information about the arrangement of the overhead line, to control the actuator by means of a further control signal such that the contact strip is arranged in the contact strip range. This enables a reliable contact of the contact strip on the overhead line to be insured. At the same time it avoids the actuator having to carry out high accelerations to insure a contact of the contact strip on the overhead line. This enables a closed-loop control path of the actuator to be embodied with inertia.

In a further form of embodiment the control unit takes account of the result of the comparison when establishing the further control signal for the actuator.

In a further form of embodiment the control unit takes account of the width of the contact strip and/or a width of a pivot range of the contact strip transverse to a longitudinal axis of the vehicle when establishing the driving channel.

In a further form of embodiment the motor vehicle has a data interface, wherein the data interface is connected to the control unit and is able to be connected to a central processor. The control unit is embodied to store first information of the first sensor in conjunction with second information about a global position of the motor vehicle in the data memory, wherein the control unit is embodied, after a predefined time interval, to provide a data signal with the first information in conjunction with the second information to the data interface.

In a further form of embodiment the data interface is embodied to detect a central processor data signal of a central processor. The data interface is embodied to provide the control unit with the central processor data signal, wherein the central processor data signal has further information about an updated arrangement of the overhead line. The control unit is embodied to replace and/or to supplement the information stored in the data memory about the arrangement of the overhead line by further information about the updated arrangement of the overhead line. This has the advantage that the position of the motor vehicle is always calculated based on the current information of the arrangement of the overhead line. This enables the position of the motor vehicle to be especially precise and enables incorrect determinations of the position of the vehicle to be avoided.

In a further form of embodiment the system has a first motor vehicle, at least one second motor vehicle and a central processor. The first motor vehicle and the second motor vehicle are embodied as described above. The central processor has a central processor data interface, a central processing device and a central data memory. The central data memory is connected to the central processing device and the central processor data interface is connected to the central processing device. A predefined parameter is stored in the central data memory, wherein the central processor data interface is connected by use of a data signal to the data interface of the first motor vehicle and/or by use of a further data signal to the data interface of the second motor vehicle. The data signal of the first motor vehicle provides the first information of the first sensor of the first motor vehicle in conjunction with the second information about the global position of the first motor vehicle and the further data signal of the second motor vehicle the first information of the first sensor of the second motor vehicle in conjunction with the second information about the global position of the second motor vehicle. The central data interface is embodied to detect the data signal of the first motor vehicle and of the second motor vehicle and provide it to the central processing device. The central processing device is embodied, based on the first information and the second information of the first motor vehicle and the first information and the second information of the second motor vehicle as well as the predefined parameter, to calculate information about an updated arrangement of the overhead line. This enables the newly arranged overhead line to be updated, in particular automatically after repair work on the overhead line.

In a further form of embodiment the central processor data interface is embodied to provide a central data signal with the information about the updated arrangement of the overhead line. The data interface of the first motor vehicle and/or of the second motor vehicle is embodied to detect the central data signal.

In a further form of embodiment the first sensor determines a position of the overhead line relative to the motor vehicle and provides the control unit with the relative position. The global positioning device determines a global position of the motor vehicle and provides the control unit with the global position. The control unit calculates a position of the vehicle on the basis of the established relative position, the established global position and the information about the arrangement of the overhead line.

In a further form of embodiment the second sensor establishes a trajectory of the motor vehicle and provides the control unit with the trajectory. The control unit calculates a driving channel on the basis of the position of the motor vehicle and the arrangement of the overhead line. The control unit compares the driving channel with the trajectory in a comparison and a control signal is provided depending on the result of the comparison.

In a further form of embodiment the control unit controls the display device by means of the control signal such that the display device displays a direction of travel for a driver of the motor vehicle. In this way a departure from the predetermined driving channel can be avoided.

In a further form of embodiment the central processor data interface is connected by a data signal to the data interface of the first motor vehicle and/or by a further data signal to the data interface of the second motor vehicle, wherein the central data interface detects the data signal of the first motor vehicle and of the second motor vehicle and provides them to the central processing device. The central processing device calculates information about an updated arrangement of the overhead line based on the first information and the second information of the first motor vehicle and the first information and the second information of the second motor vehicle as well as the predefined parameter.

Other features which are considered as characteristic for the invention are set forth in the appended claims.

Although the invention is illustrated and described herein as embodied in a motor vehicle, a system and a method for operating such a motor vehicle and such a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
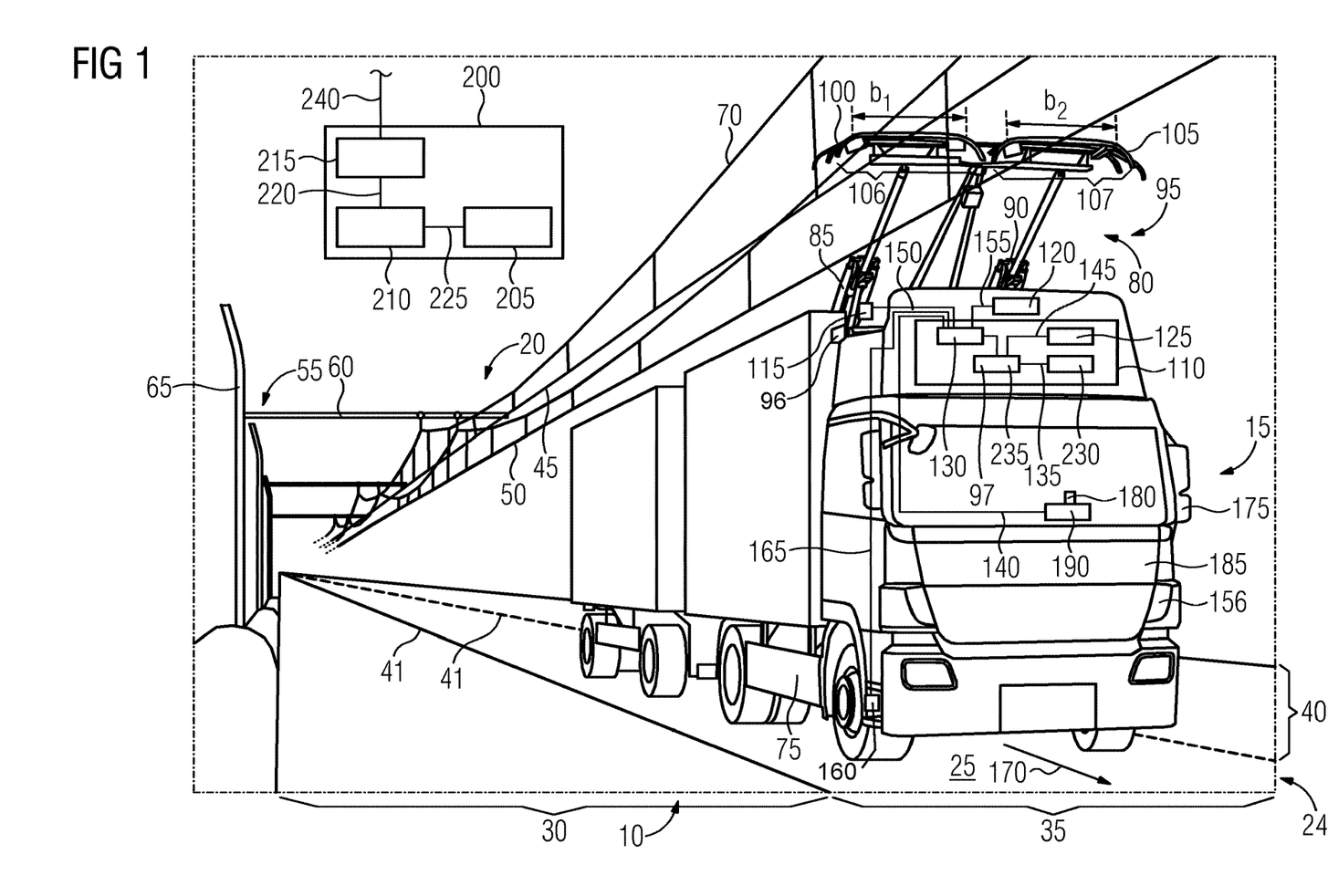
FIG. 1 is a diagrammatic, perspective view of a system according to the invention.

Referring now to the figures of the drawings in detail and first, particularly to FIG. 1 thereof, there is shown a perspective diagram of a system 10.

By way of example the system 10 has at least one motor vehicle 15, an electrical energy supply 20 and a road 24 with a roadway 25. The motor vehicle 15 is embodied to drive on the roadway 25. The motor vehicle 15 can be a commercial vehicle, in particular a truck for example, an automobile or a bus.

In the form of embodiment the road 24 has a hard shoulder 30 for example, a first lane 35 and a second lane 40 for example. The first lane 35 and the second lane 40 have the same direction of travel. The roadway 25 has roadway markings 41 for separating the hard shoulder 30, the first lane 35 and the second lane 40, which can be embodied for example as a solid line or a dashed line.

The road 24 can however also be embodied in another way. Thus for example the hard shoulder 30 can be dispensed with and/or only one of the lanes 35, 40 can be provided. Also the number of lanes 35, 40 chosen can be other than that shown in FIG. 1.

The motor vehicle 15 is driving in the first lane 35 for example. As an alternative the motor vehicle 15 can also drive in the second lane 40 or, for example if it departs from the lane, in the first lane 35 and the second lane 40 or in the first lane 35 and on the hard shoulder 30.

The location of the electrical energy supply 20 is fixed. The electrical energy supply 20 has a first overhead line 45 and a second overhead line 50. The first overhead line 45 and the second overhead line 50 are essentially arranged running in parallel to one another in one plane, which essentially runs in parallel to the roadway 25. The first overhead line 45 can also be arranged below the second overhead line 50.

The overhead line 45, 50 is supported by a stationary holding device 55, which for example has an outrigger 60 and a mast 65 bearing the outrigger 60, for example above the first lane 35. The holding devices 55 are arranged along the roadway 25 at a distance from one another. Between the individual holding devices 55 the overhead line 45, 50 is arranged running in a straight line. The overhead line 45, 50 is electrically connected to a central energy supply (not shown). In this case the first overhead line 45 can be embodied as the outgoing conductor and the second overhead line 50 as the return conductor. In order to carry the overhead line 45, 50 essentially in parallel to the roadway 25, a support cable 70 can additionally be provided above an overhead line 45, 50, which is fastened to the outrigger 60 and supports the overhead line 45, 50.

The motor vehicle 15 has a drive device 75. The drive device 75 is embodied as a hybrid drive for example. The drive device 75 can also contain just an electric drive or just an internal combustion engine.

The drive device 75 has a current collector 80 for example. The current collector 80 can be dispensed with in particular for the method described in FIGS. 3 and 7.

In the form of embodiment the current collector 80 is arranged behind the driver's cab on the chassis of the motor vehicle 15. The current collector 80 has at least one actuator 85, 90, a supporting structure 95 and at least one contact strip 100, 105 in each case. The supporting structure 95 is mechanically connected to a vehicle structure 96 of the motor vehicle 15 on one side and on the other side is connected to the contact strip 100, 105.

In the form of embodiment a contact strip 100, 105 is provided for each overhead line 45, 50. The contact strip 100, 105 is switchably connected electrically to the electric machine of the drive device 75. The underside of the contact strip 100, 105 is pressed by the supporting structure 95 in the hinged-on state onto the overhead line 45, 50. Through the action of the contact strip 100, 105 sliding along it, the overhead line 45, 50 is worn away on its lower side and forms a mirror-like surface on the overhead line 45, 50, through which the overhead line 45, 50 in the forward direction of travel, is difficult to detect.

The actuator 85, 90 is mechanically coupled to the supporting structure 95 and is supported on the vehicle structure 96 for example. The actuator 85, 90 serves to alter a contact strip position of the contact strip 100, 105 relative to the overhead line 45, 50 and to the motor vehicle 15. In particular the actuator 85, 90 serves to hinge the contact strip 100, 105 onto the line, i.e. to bring the respective contact strip 100, 105 into touching contact with the assigned overhead line 45, 50. The actuator 85, 90 can also hinge the current collector 80 away from the line, i.e. mechanically separate the contact strip 100, 105 from the overhead line 45, 50.

Depending on embodiment of the supporting structure 95, the actuator 85, 90 can also alter the contact strip position in the direction transverse to the longitudinal direction of the vehicle.

The actuator 85, 90 can have one or more actuator elements in each case, wherein each of the actuator elements is embodied to move the contact strip 100, 105 in one direction. Thus the actuator 85, 90 can have a first actuator element for example for making contact and breaking contact respectively and a second actuator element for moving the contact strip 100, 105 in the transverse direction transverse to the longitudinal direction of the vehicle. The first and second actuator element can be activated independently of one another in such cases. The actuator elements can also be embodied differently from one another. Thus for example the first actuator element can be activated pneumatically and the second actuator element can have an electric servo motor as its drive.

The motor vehicle further has a closed-loop control path 97 for positioning the contact strip 100, 105 relative to the overhead line 45, 50. The closed-loop control path 97 activates the actuator 85, 90.

The first contact strip 100 has a first contact area 106 and the second contact strip 105 has a second contact area 107. In the contact area 106, 107, the contact strip 100, 105 in the contacted state, provides a reliable electrical connection with the overhead line 45, 50 assigned to the contact strip 100, 105 in each case. The first contact area 106 has a first contact width $b_1$ and the second contact area 107 has a second contact width $b_2$. The contact width $b_1$, $b_2$ extends transverse to the longitudinal direction of the vehicle.

The motor vehicle 15 further has a control device 110, a first sensor 115 and a global positioning device 120.

The control device 110 has a data memory 125, an interface 130 and a control unit 135.

The control unit 135 is connected by a first connection 140 to the interface 130. The data memory 125 is connected to the control unit 135 by a second connection 145. At least one item of information of the arrangement of the overhead line 45, 50 and of the roadway 25, for example as a topographical map, is held in the data memory 125. In this case for example the arrangement of the overhead line 45, 50 on the holding devices can be allocated predefined coordinates, which are linked with the straight-line course of the overhead line 45, 50. In addition the embodiment of the roadway 25 can be held in the data memory 125 for the respective coordinate.

The first sensor 115 is connected by a third connection 150 and the global positioning device 120 by a fourth connection 155 to the interface 130.

The first sensor 115 is preferably arranged on the supporting structure 95 and for example decoupled from a cab 156 of the motor vehicle 15. The first sensor 115 can however also be a sensor arrangement consisting of a number of sensors. In the form of embodiment the first sensor 115 is embodied as a laser scanner. In addition or as an alternative it is also conceivable for the first sensor 115 to be embodied as a LiDAR sensor and/or radar sensor and/or image acquisition device.

The first sensor 115 acquires a position of the overhead line 45, 50 relative to the first sensor 115. The first sensor 115 provides the control unit with the acquired relative position 135 via the third connection 150, the interface 130 and the first connection 140. The control unit 135 acquires the relative position.

The global positioning device 120 can for example be a part of a satellite navigation system (for example GPS or GLONASS) and acquire data signals from different satellites and calculate a global position 250 of the motor vehicle 15 on the basis of the acquired data signals. The global positioning device 120 provides the control unit 135 with the acquired global position 250 via the fourth connection 155 and the interface 130 as well as the first connection 140. The control unit 135 acquires the global position.

In addition the motor vehicle 15 can have at least one second sensor 160. The second sensor 160 is connected to the interface 130 by a fifth connection 165. The second sensor 160 in this case can be part of a driver assistance system and/or a safety system, in particular an airbag system. The second sensor 160 can however also be a sensor arrangement consisting of a number of sensors. The second sensor 160 in this case can be an acceleration sensor, which acquires an acceleration of the motor vehicle 15 in at least one spatial direction, preferably at least two spatial directions, in particular all spatial directions. In addition or as an alternative the second sensor 160 can also comprise a velocity sensor element, which acquires a velocity of the motor vehicle 15 in at least one of the spatial directions. The second sensor 160 can for example also acquire information about a rotational speed of the wheels of the motor vehicle 15 and/or or a steering movement. The second sensor 160 can also be dispensed with.

The second sensor 160 establishes a trajectory 170 of the motor vehicle 15 and provides the control unit 135 with the established trajectory 170 via the fifth connection 165 and the interface 130 as well as the first connection 140. The control unit 135 acquires the established trajectory 170.

If the motor vehicle 15 is controlled partly autonomously or by a vehicle driver, then the motor vehicle 15 advantageously has a display device 175. The display device 175 in this case is arranged within visual range of the driver of the motor vehicle 15.

The display device 175 has a first optical display element 180 and a second optical display element 185 for example, which are arranged for example in the transverse direction in relation to the longitudinal direction of the vehicle offset in relation to one another. The display device 175 is connected to the interface 130 of the control device 110 by a sixth connection 190. As an alternative it is also conceivable for the display device 175 to be embodied, via a signal that can be detected haptically, for example a vibration on a steering wheel and/or the effect of a force in the steering wheel, to display a steering movement direction to the vehicle driver.

If the motor vehicle 15 is embodied as an autonomous vehicle, the display device 175 can be dispensed with. As an alternative the sixth connection 190 can be connected in this case to a further control device for autonomous driving operation of the motor vehicle 15.

In addition, when the current collector 80 is provided, the actuator 85, 90 can be connected by a seventh connection 195 to the interface 130.

In addition the system 10 can have a central processor 200. The central processor 200 has a central data memory 205, a central processing device 210 and a central processor data interface 215. The central processor data interface 215 is connected to the central processing device 210 by an eighth connection 220. The central data memory 205 is further connected to the central processing device 210 by a ninth connection 225.

A predefined parameter is held in the central data memory 205. The predefined parameter can be an algorithm in this case, in particular a simultaneous localization and mapping (SLAM) algorithm.

In addition the control device 110 can have a data interface 230 for linking the control device 110 to the central processor 200, which is connected to the control unit 135 by a tenth connection 235.

The data interface 230 is connected to the central processor data interface 215 at least temporarily via a data connection 240. The data connection 240 is preferably embodied as a wireless connection and can be embodied via a mobile radio network for example.

Figure 2:
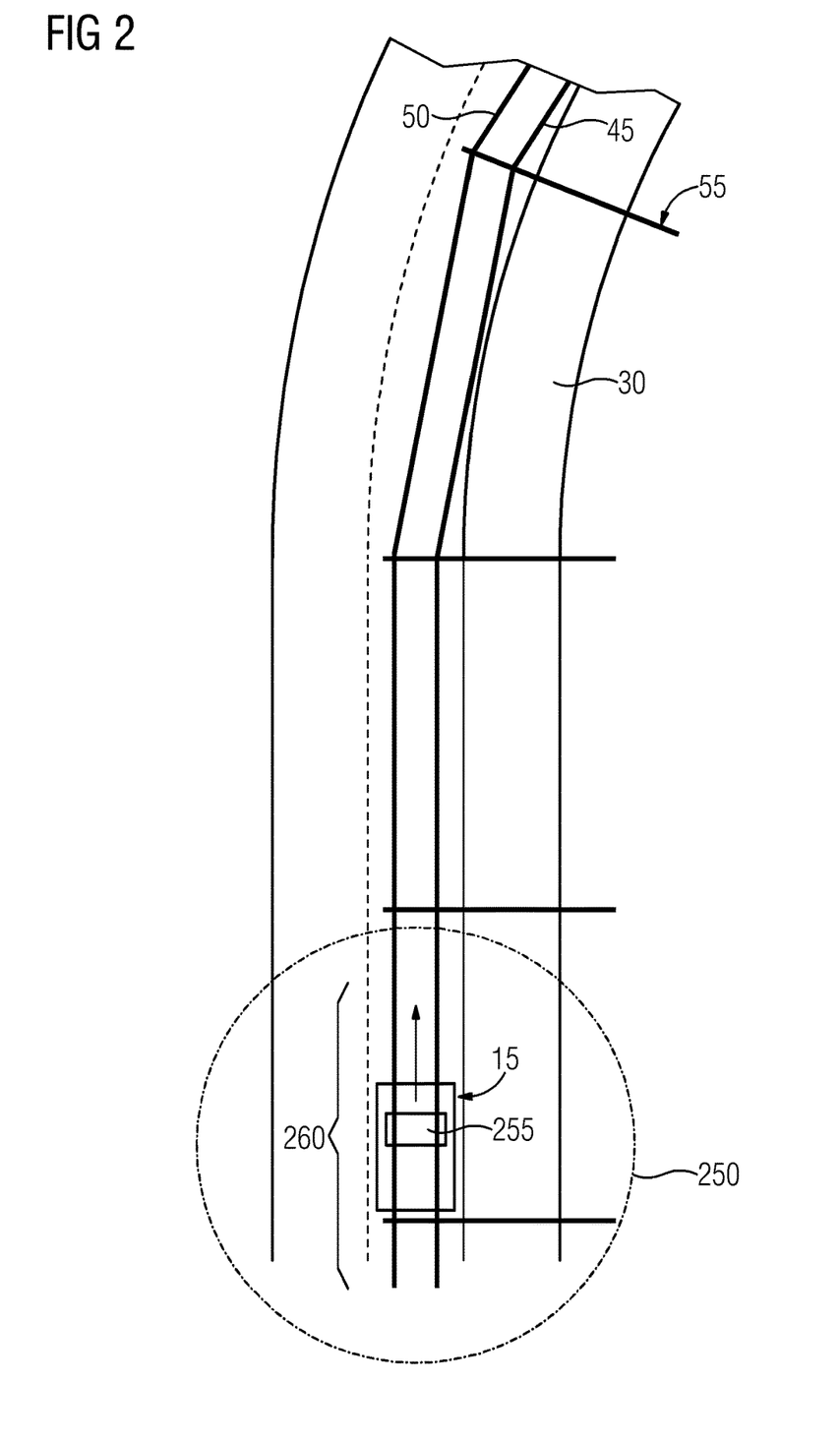
FIG. 2 is an illustration showing an overhead view of the system shown in FIG. 1.
Figure 3:
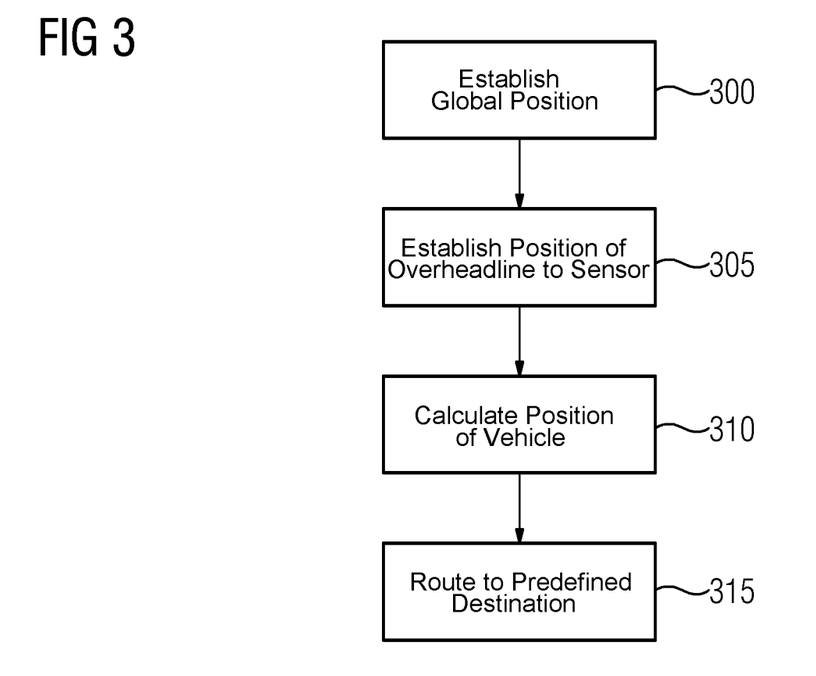
FIG. 3 is a flow diagram of a method according to a first form of embodiment for operation of a motor vehicle of the system shown in FIGS. 1 and 2.

FIG. 2 shows an overhead view of the system 10 shown in FIG. 1. FIG. 3 shows a flow diagram of a method for operation of the motor vehicle 15 shown in FIG. 1.

In a first method step 300 the global positioning device 120 establishes the global position 250 of the motor vehicle 15. The global position 250 may exhibit a deviation from the motor vehicle position 255 of the motor vehicle 15, which is symbolized by the dashed line in FIG. 2. The deviation of the global position 250 in relation to the motor vehicle position 255 of the motor vehicle 15 can amount to up to 30 meters.

The global positioning device 120 provides the control unit 135 with the established global position 250. The control unit 135 acquires the global position 250. If necessary the control unit 135 stores the global position 250 in the data memory 125 for further processing.

In a second method step 305, which can also be carried out in parallel in time with the first method step 300, the first sensor 115 establishes the position of the first sensor 115 relative to the overhead line 45, 50. If the first sensor 115, as described above, is embodied as a laser scanner for example, then the first sensor 115 scans the arrangement of the overhead line 45, 50 relative to the first sensor 115 from below essentially transverse to the longitudinal direction of the vehicle and, on the basis of the acquired radiation of the first sensor 115 reflected back from the overhead line 45, 50, establishes the relative position.

The first sensor 115 provides the control unit 135 with the relative position and the control unit 135 acquires the relative position. Optionally the control unit 135 stores the acquired relative position in the data memory 125 of the control device 110. In addition the established relative position can be linked to a time stamp and/or stored in the data memory 125 with an assigned global position.

In a third method step 310 the control unit 135, on the basis of the established relative position and the established global position 250, as well as the information about the arrangement of the overhead line 45, 50, calculates a position of the motor vehicle 255. To do this the control unit 135 can advantageously use a map matching method, in order, in a first substep, to assign the global position 250 to a roadway section 260 of the roadway 25, wherein, in a second substep, the position of the motor vehicle 255 on the road 24 is established on the basis of the established relative position, likewise by means of a map matching method.

The determination of the position of the motor vehicle 255 by the first sensor 115 and the global positioning device 120 has the advantage that the overhead line 45, 50 can be detected by the first sensor 115, even in bad weather. In particular with heavy contamination of the roadway 25 and/or with a covering of snow on the roadway 25, the position of the motor vehicle 255 can be precisely determined reliably and exactly down to a few millimeters.

It is of particular advantage in this case for the control unit 135 to take account of an offset between the arrangement of the first sensor 115 and of the global positioning device 120 during the determination of the position of the motor vehicle 255.

In particular it is conceivable here that, unlike in the embodiment of the motor vehicle 15 shown in FIG. 1, the current collector 80 and/or the central processor 200 and/or the data connection 240 can also be dispensed with. This means that the method for determining the position of the motor vehicle 255 described in FIG. 2 is also suitable for private automobiles, in particular for private automobiles of a conventional construction.

In a fourth method step 315 the control unit 135 takes account of the established position of the motor vehicle 255, for routing to a predefined destination for example, and/or passes the established position of the motor vehicle 255 to the further control device for a semi-autonomous or autonomous driving of the motor vehicle 15.

The method is embodied in a similar manner to the method described in FIG. 2.

Figure 4:
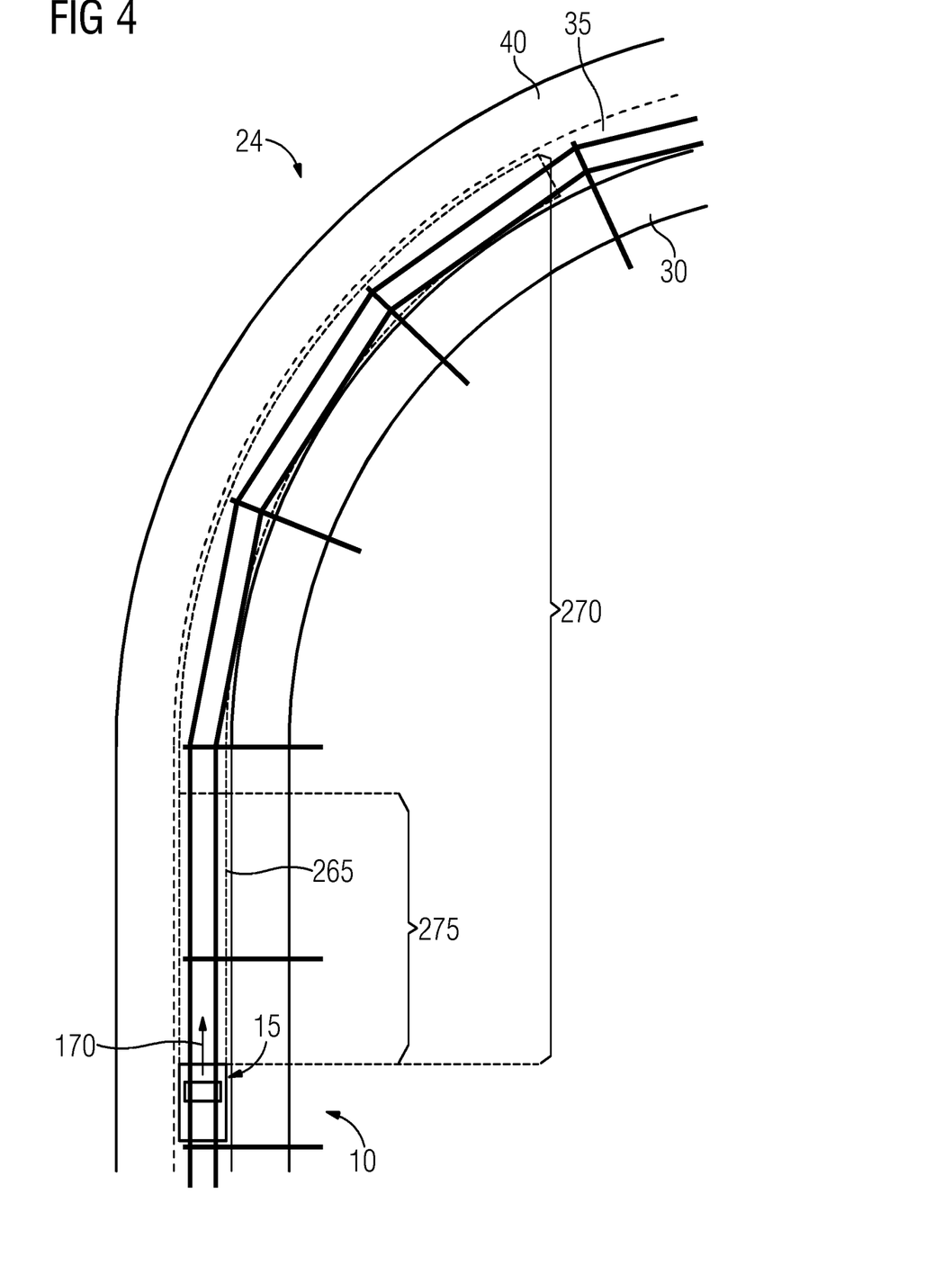
FIG. 4 is an illustration showing an overhead view of the system shown in FIG. 1.
Figure 5:
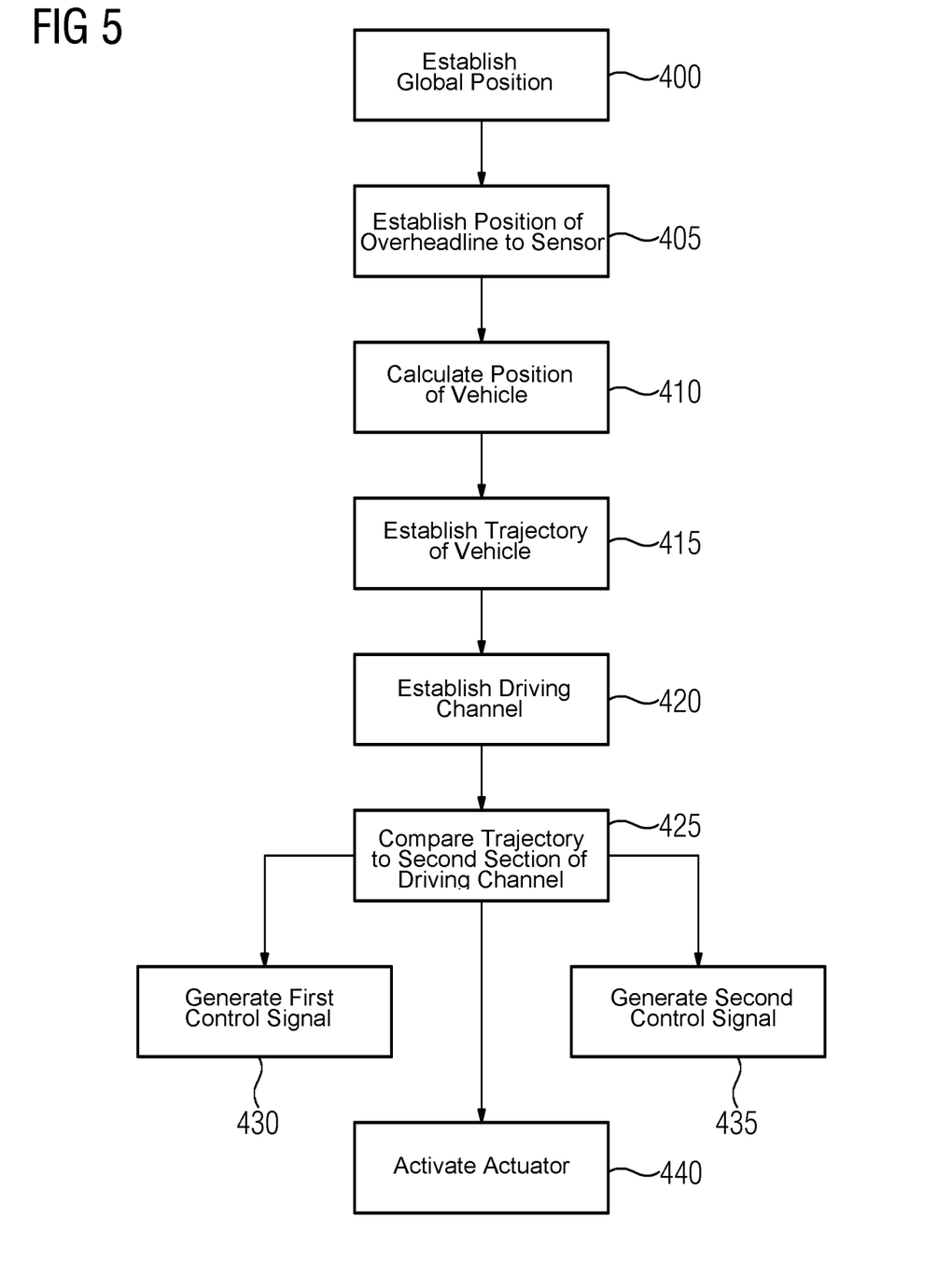
FIG. 5 is a flow diagram of a method according to a second form of embodiment for operation of a motor vehicle of the system shown in FIG. 4.

FIG. 4 shows an overhead view of the system 10 shown in FIG. 1 in accordance with a second form of embodiment. FIG. 5 shows a flow diagram of a method in accordance with a second form of embodiment for operation of the motor vehicle 15 of the system 10 shown in FIG. 4.

The method has a first to third method step 400, 405, 410. The first to third method step 400, 405, 410 are embodied identically for example to the first to third method step 300, 305, 310 explained in FIG. 2.

In a fourth method step 415, the second sensor 160 establishes the trajectory 170 of the motor vehicle 15. The second sensor 160 provides the control unit 135 with the established trajectory 170, which acquires the trajectory. If necessary the control unit 135 stores the trajectory 170 in the data memory 125.

In a fifth method step 420, on the basis of the information of the arrangement of the overhead line 45, 50 as well as the width $b_1$, $b_2$ of the contact strip 100, 105, the control unit 135 establishes a driving channel 265 for the motor vehicle 15 for a predefined first section 270 of the street 24 in front of the motor vehicle 15. The driving channel 265 in this case forms an area in which the motor vehicle 15 can drive, without departing from the lane 35, 40 and the contact strips 100, 105 are in contact with the overhead line 45, 50. It is of particular advantage for the control unit 135, when establishing the driving channel 265, additionally to take into account a course of the roadway 25, in particular at least one lane 35, 40 when establishing the driving channel 265. The driving channel 265 is represented symbolically in FIG. 4 as a dashed line.

The driving channel 265 is calculated in front of the motor vehicle 15 for a predetermined first section 270 of the street that is larger than the scanning range of the first sensor 115, preferably for an area of several hundred meters in front of the motor vehicle 15.

In the driving channel 265 it is insured that each of the contact strips 100, 105 has a reliable touch contact with the respective assigned overhead line 45, 50. By taking account of the lane 30, 35, 40, it is insured that the driving channel 265 runs within a single lane 35, 40 and if necessary exceeding the driving channel 265 through to the hard shoulder 30 or occupying both lanes 35, 40 simultaneously can be avoided.

In a sixth method step 425 the control unit 135 compares the established trajectory 170 with a predefined second section 275 of the driving channel 265. The second section 275 lies directly in front of the motor vehicle 15. The second section 275 in this case is much larger than the scanning range of the first sensor 115, but is also smaller than the established driving channel 265.

Depending on the comparison, the control unit 135 continues with a seventh method step 430 or an eighth method step 435.

If the control unit 135 establishes for example, as shown in FIG. 5, in the comparison, that the motor vehicle 15, with the established trajectory 170 in the fourth method step 415 will not leave the second section 275 of the driving channel 265 with the existing trajectory 170, then in the seventh method step 430, the control unit 135 provides the display device 175 with a first control signal. With the first control signal the control unit 130 activates the display device 175 such that none of the display elements 180, 185 are activated.

If the control unit 135 establishes in the comparison that the motor vehicle 15, with the trajectory 170 established in the fourth method step 415, will leave the second section 275 of the driving channel 265 with the existing trajectory 170, then in the eighth method step 435 the control unit 135 provides the display device 175 with a second control signal. With the second control signal the control unit 130 activates the display device 175 such that, for example on the side on which the motor vehicle 15 will leave the second section 275 of the driving channel 265, the respectively arranged display element 180, 185 is activated.

In this way a pleasant driving experience can be provided for the vehicle driver, without the vehicle driver having to explicitly keep an eye on both the roadway 25 and also the overhead line 45, 50, in order to insure an ongoing contact between the contact strip 100, 105 and the overhead line 45, 50.

If the motor vehicle 15 is embodied as an autonomous motor vehicle, the information about the result of the comparison can be passed to the further control device for autonomous driving, which takes account of the information for control of the motor vehicle 15.

A further advantage is for the closed-loop control path 97 to be embodied by the control unit 135 for example, wherein the closed-loop control path 97, in a ninth method step 440, is supplied with the second section 275 as a setpoint value and the control unit 135, on the basis of an actual value of the actuator 85, 90 and/or an actual value of the relative alignment of the contact strip 100, 105 to the overhead line 45, 50, activates the actuator. In this case the control unit 135 can take account of both a vertical offset and/or a horizontal offset of the overhead line 45, 50 to the position of the motor vehicle.

By activating the display elements 180, 185 the vehicle driver can alter course at an early stage, so that the contact strips 100, 105 are always arranged favorably in relation to the respectively assigned overhead line 45, 50. Furthermore this avoids the actuator 85, 90, because of the restricted scanning range of the first sensor 115, having the alter the arrangement of the contact strip 100, 105 relative to the motor vehicle 15, but also to the overhead line 45, 50 in especially short periods of time, in particular in the range of a few milliseconds.

The fact that the second section 275 of the driving channel 265 can be taken into account as well for the closed-loop control path 97, means that a horizon for the closed-loop control path 97 compared to the scanning range of the sensor 115 is expanded, so that the actuator 85, 90 can adjust the contact strip 100, 105 with a smaller speed of travel and with lower accelerations. This means that the forces and accelerations acting on the supporting structure 95 are reduced. Also a power of the actuators 85, 90 can be reduced compared to current actuators. In particular this enables the current collector 80 to be embodied especially light and inexpensively.

Figure 6:
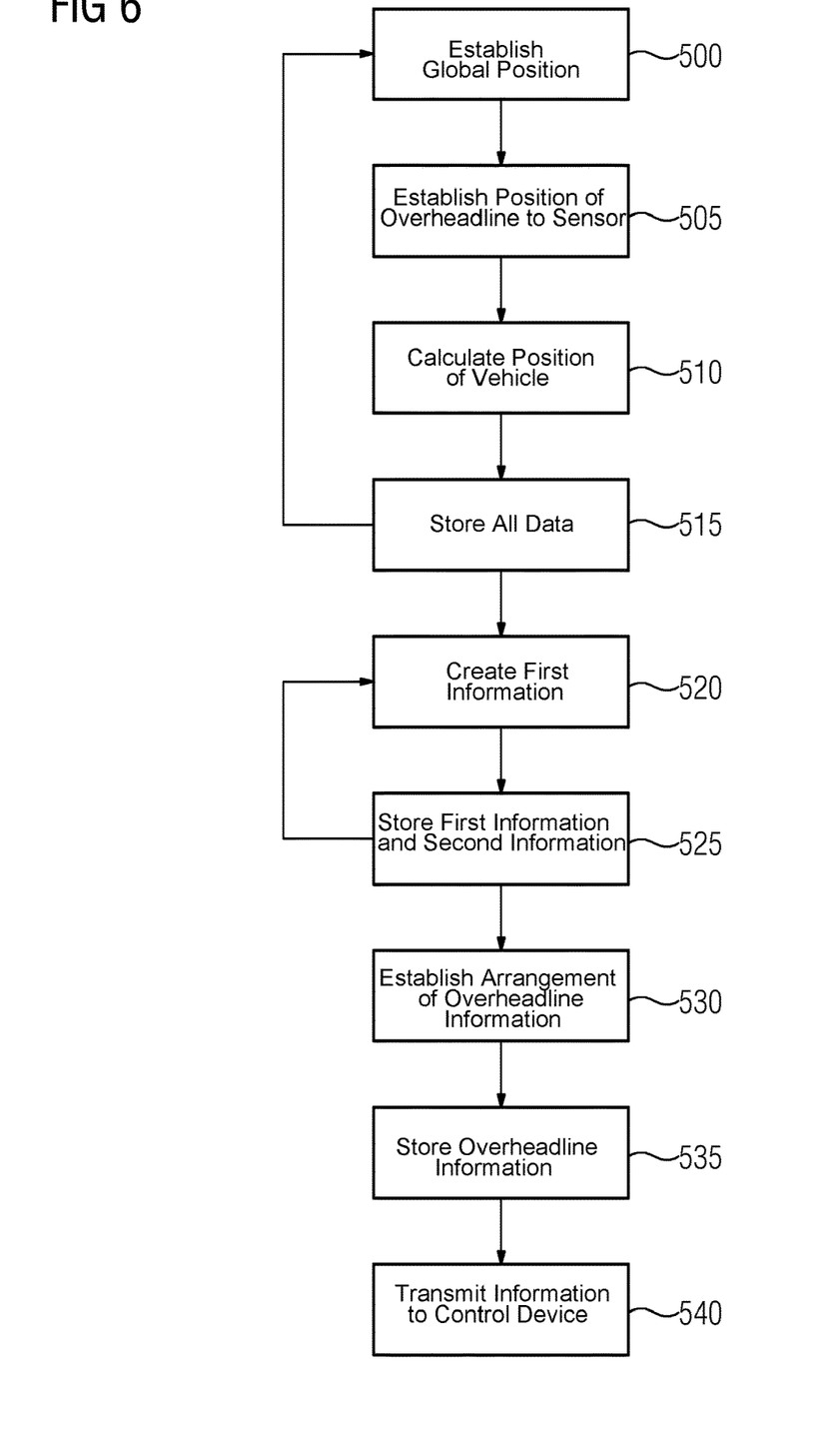
FIG. 6 is a flow diagram showing a method according to a third form of embodiment for operation of a motor vehicle of the system shown in FIG. 7.
Figure 7:
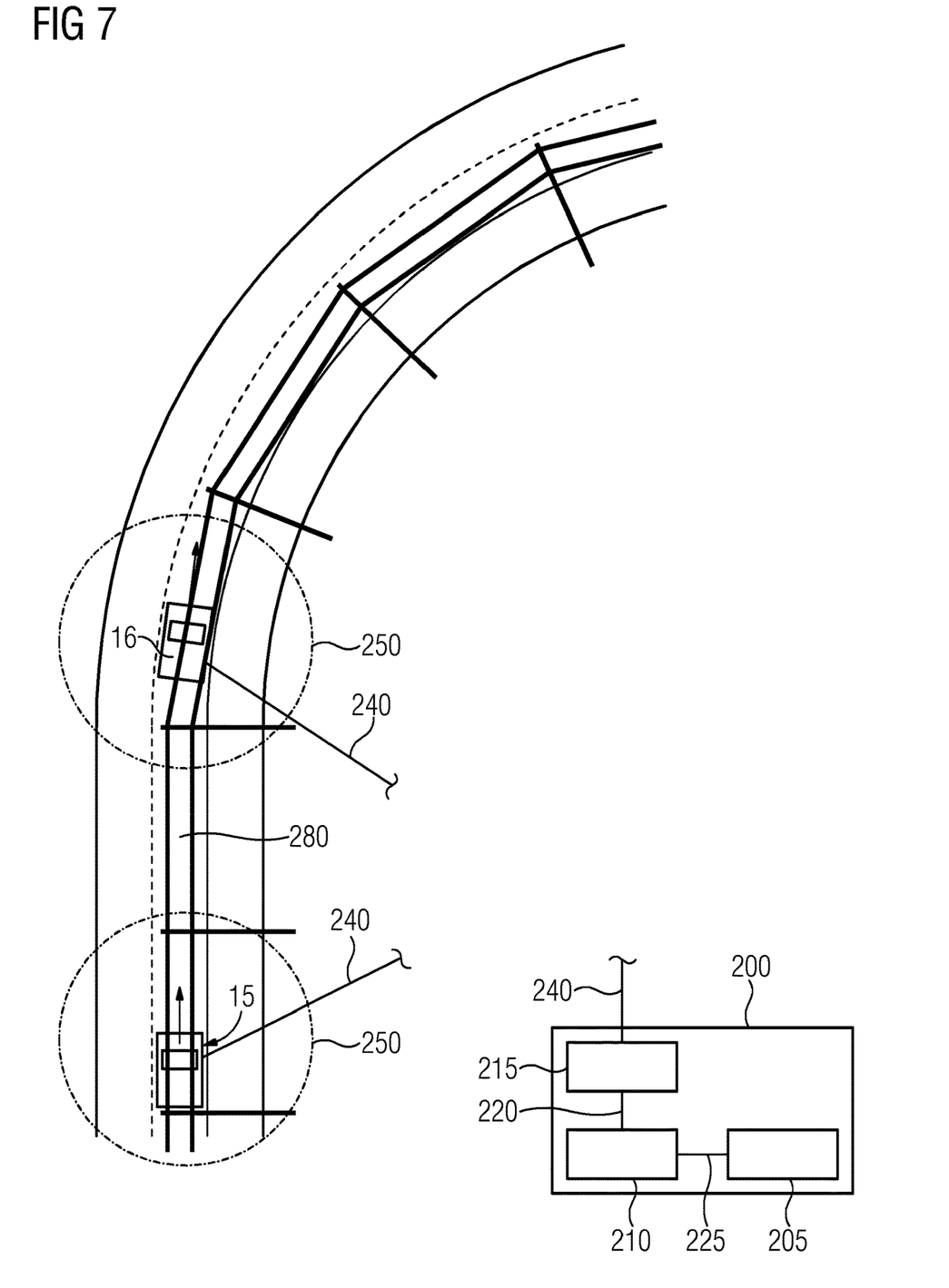
FIG. 7 is an illustration showing an overhead view of a variant of the system shown in FIG. 1.

FIG. 6 shows a flow diagram of a method in accordance with a third form of embodiment for operation of the system 10 shown in FIG. 7. FIG. 7 shows an overhead view of a variant of the system 10 shown in FIG. 1.

The system 10 is embodied similar to the system 10 shown in FIGS. 1 and 5. Unlike in these figures, a first motor vehicle 15 and at least one second motor vehicle 16 are arranged on the roadway 25. The motor vehicles 15, 16 are embodied as in FIG. 1 and can have the current collector 80. The motor vehicles 15 are each connected via a separate data connection 240 to the central processor data interface 215. The data connection 240 between the individual motor vehicles 15 can exist temporarily alternating or simultaneously.

During operation of the system 10 the first motor vehicle 15 carries out a first to third method step 500, 505, 510. The first to third method steps 500, 505, 510 are identical to the first to third method steps 300, 305, 310 described in FIG. 2.

In a fourth method step 515 the control unit 135 of the first motor vehicle 15 stores the position of the arrangement of the overhead line 45, 50 relative to the first sensor 115 in conjunction with the established global position 250 in the data memory 125 of the first motor vehicle 15.

The first to fourth method steps 500, 505, 510, 515 are preferably carried out continuously in a repeated loop, wherein the information about the global position 250 and the relative position along a route 280 of the motor vehicle 15 is stored.

The first to fourth method step 500 to 515 is carried out in the same way by the further motor vehicle 16.

After a predefined time interval has elapsed and/or after an interrogation signal of the central processor 200 provided through the data connection 240, the control unit 135 of the first motor vehicle 15, in a fifth method step 520, builds the collected information about global positions 250 and assigned relative positions in each case via the data connection 240 as first information of the first motor vehicle 15 to the central processor 200.

In a sixth method step 525 the central processor data interface 215 acquires the sent information and forwards it to the central processing device 210. The central processing device 210 stores the first information in the central data memory 205.

The fifth and sixth method step 520, 525 are repeated for the second motor vehicle 15, 16. In this case the central processing device 210 stores second information of the second motor vehicle 16 in the central data memory 205 in each case.

In a seventh method step 530 the central processing device 210 establishes, on the basis of first and second items of information about the relative position in conjunction with the global position 250 of the motor vehicles 15 as well as the predefined parameter stored in the central data memory 205, information about an updated arrangement of the overhead line 45, 50.

In an eighth method step 535 the central processing device 210 stores the updated information about the updated arrangement of the overhead line 45, 50 in the central data memory 205.

In a ninth method step 540 the information about the updated arrangement of the overhead line 45, 50 is transmitted by means of a further data signal to the respective control device 110 of the motor vehicle 15, 16.

The ninth method step 540 is repeated for each motor vehicle 15, 16.

The control unit 135 stores the information about the updated arrangement of the overhead line 45, 50 in the data memory 125, preferably by overwriting the information about the overhead line 45, 50 originally stored in the data memory 125.

This embodiment has the advantage that changes, especially after maintenance work on the overhead line 45, 50, are especially detected and the motor vehicle 15 can be operated particularly quickly on the basis of the updated arrangement. In particular, in conjunction with the method described in FIGS. 4 and 6, a reliable electrical contact of the contact strip 100, 105 on the overhead line 45, 50 can be insured. An even wear of the contact strip 100, 105 is also insured.

Furthermore, through the combination of the method described in FIG. 4 with the method described in FIG. 6, an especially exact guidance of the contact strip 100, 105, both in the horizontal and also in the vertical direction, is insured. Furthermore possible damage to the actuator 85, 90 or the supporting structure 95 and/or the contact strip 100, 105 can be avoided.

Through the method described in FIG. 6, information accurate to a few millimeters, preferably a topographical map of the overhead line 45, 50, can be made available.

Through a combination of the methods described in FIGS. 3 and 6, the position of the motor vehicle 255 can be determined precisely down to just a few millimeters.

It is pointed out that further sensors can of course also be provided in addition. In particular it is conceivable here for the control unit 135 to be provided with information from a lane recognition system, in order, in this way, to establish the arrangement of the overhead line 45, 50 relative to the lane 30, 35 especially reliably.

In addition it is also conceivable that the system 10 has markings accommodated at regularly defined points, which are acquired by a corresponding vehicle-side sensor system and are used to calibrate the established position of the motor vehicle 255 at these predefined positions.

In a further form of embodiment of the system 10 shown in FIGS. 5 and 7 it is also conceivable that, as a result of the acquired arrangement of the overhead line 45, 50, wear and/or damage will be detected by a comparison of the updated arrangement with the arrangement of the overhead line 45, 50 originally stored in the data memory 125 and that if the updated arrangement of the overhead line 45, 50 deviates from the original arrangement of the overhead line 45, 50, damage to the overhead line 45, 50 is detected. In particular with a lateral deviation of the overhead line 45, 50 from the original arrangement of the overhead line 45, 50, for example caused by damage to the holding device 55, this can be detected in a simple manner.

Through the embodiment of the system 10 described above, the position of the motor vehicle 15 can be detected reliably and especially precisely in bad weather conditions.

Furthermore the first sensor 115 can be attached in a well-protected position close to the overhead line 45, 50, for example to a support frame for the supporting structure 95, and in this way a reliable acquisition of the overhead line 45, 50 can be insured.

Although the invention has been illustrated and described in greater detail by preferred exemplary embodiments, the invention is not restricted by the disclosed examples and other variations can be derived herefrom by the person skilled in the art, without departing from the scope of protection of the invention.

The invention claimed is:

1. A motor vehicle, comprising:
   a first sensor;
   a global positioning device;
   a control device having a control unit and a data memory, wherein at least one item of information about a configuration of an overhead line is stored in said data memory, said control unit is connected to said first sensor and to said global positioning device;
   said first sensor determining a position of the overhead line relative to the motor vehicle and providing said control unit with a relative position;
   said control device compares the configuration of the overhead line saved in said data memory with a just measured configuration of the overhead line for detecting damage to the overhead line;
   said global positioning device determining a global position of the motor vehicle on a basis of data signals from different satellites and, on a basis of acquired data signals, calculates the global position of the motor vehicle and provides said control unit with the global position;
   said control unit, on a basis of the relative position, the global position and the information about the configuration of the overhead line, calculates a position of the motor vehicle;
   a second sensor connected to said control unit, said second sensor establishing a trajectory of the motor vehicle and providing said control unit with an established trajectory;
   contact strips;
   said control unit, on a basis of the position of the motor vehicle, a course of a road and the configuration of the overhead line saved in the data memory, calculating a driving channel, the driving channel mapping an area, in which the motor vehicle can drive without departing from a lane of the road and said contact strips are in contact with the overhead line, the driving channel extends in an area of several hundred meters in front of the motor vehicle;
   said control unit comparing the driving channel with the trajectory in a comparison, wherein depending on a result of the comparison, said control unit provides a control signal;
   a current collector having said contact strips, at least one actuator and a supporting structure, said actuator is coupled to said supporting structure, said supporting structure bearing said contact strips and is embodied to bring said contact strips into touching contact with the overhead line;
   said actuator is connected to said control unit;
   said actuator is mechanically coupled to said supporting structure and is embodied to alter a contact strip position;
   said control unit having a closed-loop control path, said closed-loop control path is supplied with a section of the driving channel as a setpoint value, the section lies directly in front of the motor vehicle, and the section is larger than a scanning range of said first sensor; and
   said closed-loop control path, on a basis of an actual value of at least one of said actuator or an actual value of a alignment of said contact strips relative to the overhead line activates said actuator by means of a further control signal.

2. The motor vehicle according to claim 1, further comprising a display device connected to said control unit, said control unit activating said display device by means of the control signal such that said display device displays a driving correction for a driver of the motor vehicle to implement.

3. The motor vehicle according to claim 1, wherein said control unit, when determining the further control signal for said actuator, takes account of the result of the comparison.

4. The motor vehicle according to claim 1, wherein said control unit takes account of a width of at least one of said contact strips or a width of a pivot range of said contact strips transverse to a longitudinal axis of the motor vehicle when establishing the driving channel.

5. The motor vehicle according to claim 1,
   further comprising a central processor;
   further comprising a data interface connected to said control unit and is able to be connected to said central processor;
   wherein said control unit is embodied to store first information of said first sensor in conjunction with second information about the global position of the motor vehicle in said data memory; and
   wherein said control unit is embodied, after a predefined time interval, to provide a data signal with the first information in conjunction with the second information at said data interface.

6. The motor vehicle according to claim 5, wherein:
   said data interface is embodied to acquire a central processor data signal of said central processor;
   said data interface is embodied to provide said control unit with the central processor data signal;
   the central processor data signal has further information about an updated configuration of the overhead line; and
   said control unit is embodied to replace and/or to supplement the information about the configuration of the overhead line stored in said data memory by the further information about the updated configuration of the overhead line.

7. A system, comprising:
   a first motor vehicle;
   at least one second motor vehicle;
   a central processor;
   said first motor vehicle and said second motor vehicle being embodied according to claim 6;
   said central processor having a central processor data interface, a central processing device and a central data memory, said central data memory is connected to said central processing device and said central processor data interface is connected to said central processing device, wherein a predefined parameter is stored in said central data memory, wherein said central processor data interface is connected by means of a data signal to said data interface of said first motor vehicle and by means of a further data signal to said data interface of said second motor vehicle;
   wherein the data signal of said first motor vehicle provides the first information of said first sensor of said first motor vehicle in conjunction with the second information about the global position of said first motor vehicle and the further data signal of said second motor vehicle provides the first information of said first sensor of said second motor vehicle in conjunction with the second information about the global position of said second motor vehicle;

wherein said central data interface is embodied to acquire the data signal of said first motor vehicle and of said second motor vehicle and to provide said central processing device with the data signal; and wherein said central processing device is embodied, on a basis of the first information and the second information of said first motor vehicle and the first information and the second information of said second motor vehicle as well as the predefined parameter, to calculate information about the updated configuration of the overhead line.

8. The system according to claim 7, wherein:

said central processor data interface is embodied to provide a central data signal with the information about the updated configuration of the overhead line; and said data interface of said first motor vehicle and/or of said second motor vehicle is embodied to acquire the central data signal.

9. A method for operation of a motor vehicle having a current collector with contact strips, at least one actuator and a supporting structure, the actuator being coupled to the supporting structure, the supporting structure bearing the contact strips and is embodied to bring the contact strips into touching contact with an overhead line, which comprises the steps of:

determining, via a first sensor, a position of the overhead line relative to the motor vehicle and providing a control unit with a relative position;

calculating, via a global positioning device, a global position of the motor vehicle on a basis of an acquisition of data signals of different satellites and on a basis of acquired data signals, and provides the control unit with the global position;

calculating via the control unit, on a basis of the relative position, the global position and information about a configuration of the overhead line, a position of the motor vehicle;

comparing the configuration of the overhead line with a previously saved configuration of the overhead line stored in a data memory for detecting damage to the overhead line;

establishing, via a second sensor, a trajectory of the motor vehicle and providing the control unit with the trajectory;

calculating, via the control unit, on a basis of the position of the motor vehicle and the configuration of the overhead line saved in the data memory, a driving channel, the driving channel mapping an area in which the motor vehicle can drive without departing from a lane of a road and contact strips are in contact with the overhead line, the driving channel extends in an area of several hundred meters in front of the motor vehicles;

comparing in the control unit the driving channel with the trajectory;

providing a control signal in dependence on a result of a comparison;

supplying the control unit with a closed-loop control path, the closed-loop control path having a section of the driving channel as a setpoint value, the section lying directly in front of the motor vehicle, and the section is larger than a scanning range of the first sensor, and the closed-loop control path, on a basis of an actual value of at least one of an actuator or an actual value of a alignment of contact strips relative to the overhead line activates the actuator by means of a further control signal.

10. The method according to claim 9, wherein the control unit activates a display device by means of the control signal such that the display device displays a direction of correction for a driver of the motor vehicle to implement.

11. A motor vehicle, comprising:

a first sensor;

a global positioning device;

a control device having a control unit and a data memory, wherein at least one item of information about a configuration of an overhead line is stored in said data memory, said control unit is connected to said first sensor and to said global positioning device;

said first sensor determining a position of the overhead line relative to the motor vehicle and providing said control unit with a relative position;

said global positioning device determining a global position of the motor vehicle on a basis of data signals from different satellites and, on a basis of acquired data signals, calculates the global position of the motor vehicle and provides said control unit with the global position;

said control unit, on a basis of the relative position, the global position and the information about the configuration of the overhead line, calculates a position of the motor vehicle;

a second sensor connected to said control unit, said second sensor establishing a trajectory of the motor vehicle and providing said control unit with an established trajectory;

contact strips;

said control unit, on a basis of the position of the motor vehicle, a course of a road and the configuration of the overhead line saved in the data memory, calculating a driving channel, the driving channel mapping an area, in which the motor vehicle can drive without departing from a lane of the road and said contact strips are in contact with the overhead line, the driving channel extends in an area of several hundred meters in front of the motor vehicle;

said control unit comparing the driving channel with the trajectory in a comparison, wherein depending on a result of the comparison, said control unit provides a control signal;

a current collector having said contact strips, at least one actuator and a supporting structure, said actuator is coupled to said supporting structure, said supporting structure bearing said contact strips and is embodied to bring said contact strips into touching contact with the overhead line;

said actuator is connected to said control unit;

said actuator is mechanically coupled to said supporting structure and is embodied to alter a contact strip position;

said control unit having a closed-loop control path, said closed-loop control path is supplied with a section of the driving channel as a setpoint value, the section lies directly in front of the motor vehicle, and the section is larger than a scanning range of said first sensor; and said closed-loop control path, on a basis of an actual value of at least one of said actuator or an actual value of a alignment of said contact strips relative to the overhead line activates said actuator by means of a further control signal.

12. The motor vehicle according to claim 11, further comprising a display device connected to said control unit, said control unit activating said display device by means of the control signal such that said display device displays a driving correction for a driver of the motor vehicle to implement.

13. The motor vehicle according to claim 11, wherein said control unit, when determining the further control signal for said actuator, takes account of the result of the comparison.

14. The motor vehicle according to claim 11, wherein said control unit takes account of a width of at least one of said contact strips or a width of a pivot range of said contact strips transverse to a longitudinal axis of the motor vehicle when establishing the driving channel.

15. The motor vehicle according to claim 11,
further comprising a central processor;
further comprising a data interface connected to said control unit and is able to be connected to said central processor;
wherein said control unit is embodied to store first information of said first sensor in conjunction with second information about the global position of the motor vehicle in said data memory; and
wherein said control unit is embodied, after a predefined time interval, to provide a data signal with the first information in conjunction with the second information at said data interface.

16. The motor vehicle according to claim 15, wherein:
said data interface is embodied to acquire a central processor data signal of said central processor;
said data interface is embodied to provide said control unit with the central processor data signal;
the central processor data signal has further information about an updated configuration of the overhead line; and
said control unit is embodied to replace and/or to supplement the information about the configuration of the overhead line stored in said data memory by the further information about the updated configuration of the overhead line.

17. A system, comprising:
a first motor vehicle;
at least one second motor vehicle;
a central processor;
said first motor vehicle and said second motor vehicle being embodied according to claim 16;
said central processor having a central processor data interface, a central processing device and a central data memory, said central data memory is connected to said central processing device and said central processor data interface is connected to said central processing device, wherein a predefined parameter is stored in said central data memory, wherein said central processor data interface is connected by means of a data signal to said data interface of said first motor vehicle and by means of a further data signal to said data interface of said second motor vehicle;
wherein the data signal of said first motor vehicle provides the first information of said first sensor of said first motor vehicle in conjunction with the second information about the global position of said first motor vehicle and the further data signal of said second motor vehicle provides the first information of said first sensor of said second motor vehicle in conjunction with the second information about the global position of said second motor vehicle;
wherein said central data interface is embodied to acquire the data signal of said first motor vehicle and of said second motor vehicle and to provide said central processing device with the data signal; and
wherein said central processing device is embodied, on a basis of the first information and the second information of said first motor vehicle and the first information and the second information of said second motor vehicle as well as the predefined parameter, to calculate information about the updated configuration of the overhead line.

18. The system according to claim 17, wherein:
said central processor data interface is embodied to provide a central data signal with the information about the updated configuration of the overhead line; and
said data interface of said first motor vehicle and/or of said second motor vehicle is embodied to acquire the central data signal.

* * * * *